United States Patent

Grieco et al.

(10) Patent No.: US 9,940,486 B2
(45) Date of Patent: Apr. 10, 2018

(54) DETECTION OF HARDWARE TAMPERING

(71) Applicant: Cisco Technology, Inc., San Jose, CA (US)

(72) Inventors: Anthony H. Grieco, Wake Forest, NC (US); Chirag Shroff, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 14/628,870

(22) Filed: Feb. 23, 2015

(65) Prior Publication Data

US 2016/0247002 A1 Aug. 25, 2016

(51) Int. Cl.
*G06F 1/26* (2006.01)
*G06F 21/86* (2013.01)
*G06F 21/88* (2013.01)

(52) U.S. Cl.
CPC .............. *G06F 21/86* (2013.01); *G06F 21/88* (2013.01); *G06F 2221/2103* (2013.01)

(58) Field of Classification Search
CPC ........ G06F 21/572; G06F 21/86; G06F 21/88; G06F 2221/2103; H04L 9/3271;
(Continued)

(56) References Cited

U.S. PATENT DOCUMENTS 5,751,736 A * 5/1998 Deroux-Dauphin ............ G01R 31/2815
714/726
5,974,550 A * 10/1999 Maliszewski ........... G06F 21/31
726/2
(Continued)

FOREIGN PATENT DOCUMENTS

JP 2004362448 A * 12/2004
JP 2014131607 A * 7/2014

OTHER PUBLICATIONS

Gassend, "Identification and Authenticaiton of Integrated Circuits", Computer Science and Artificial Intelligence Laboratory, Computation Structures Group Memo 466, Wiley, Jun. 20013, 26 pages.*
Gassend, "Identification and Authentication of Integrated Circuits", Computation Structures Group Memo 466, Concurrency and Computation: Practice and Experience, 2003, 26 pages.*
Yan, "A Novel Way to Authenticate Untrusted Integrated Circuits", IEEE, 2015, pp. 132-138.*
(Continued)

*Primary Examiner* — Luu T Pham
*Assistant Examiner* — Walter J Malinowski
(74) *Attorney, Agent, or Firm* — Edell, Shapiro & Finnan, LLC (57) ABSTRACT

A trusted guard module stores one or more identifiers, each identifier uniquely identifying a respective electronic component of one or more electronic components in a circuit, wherein each electronic component is previously programmed with its respective identifier. In one embodiment, the one or more electronic components are in communication with the guard module via a test data channel. A query is sent from the guard module to one of the components via the test data channel, requesting that the queried component provide its respective identifier to the guard module. The guard module then receives a response from the queried component via the test data channel. The guard module compares the response to the stored identifier for the queried component. If the response fails to correspond to the stored identifier for the queried component, the guard module asserts an alarm condition.

12 Claims, 7 Drawing Sheets

(58) Field of Classification Search
CPC ....... H04W 12/06; G11C 11/34; H03K 19/00; G06Q 20/3674
USPC .................................... 726/34, 35; 455/411
See application file for complete search history.

(56) References Cited

U.S. PATENT DOCUMENTS

| | | | | |
|---|---|---|---|---|
| 6,425,094 | B1* | 7/2002 | Drogichen | G06F 11/2284 712/30 |
| 6,952,623 | B2* | 10/2005 | McAdams | G11C 16/20 365/145 |
| 7,010,688 | B1* | 3/2006 | Kawasaki | G06Q 20/341 705/64 |
| 7,113,592 | B1* | 9/2006 | Schaefer-Lorinser | G06Q 20/027 380/203 |
| 7,143,294 | B1* | 11/2006 | Johnson | H04L 9/0662 713/182 |
| 7,681,247 | B2* | 3/2010 | Williams | G06F 21/73 365/200 |
| 7,796,036 | B2 | 9/2010 | Dalzell et al. | |
| 8,222,989 | B2* | 7/2012 | Ziska | B60R 25/2018 340/5.1 |
| 8,234,220 | B2* | 7/2012 | Weiss | G06F 21/32 705/64 |
| 8,274,306 | B1* | 9/2012 | Garcia | H03K 19/17768 326/47 |
| 8,341,472 | B2 | 12/2012 | Henry et al. | |
| 8,495,758 | B2* | 7/2013 | Goyal | G01R 31/318572 726/34 |
| 8,693,692 | B2* | 4/2014 | Pinder | H04L 63/0428 380/279 |
| 8,719,957 | B2 | 5/2014 | Pedersen | |
| 8,726,407 | B2* | 5/2014 | Etchegoyen | G06F 21/57 713/176 |
| 8,798,852 | B1* | 8/2014 | Chen | G06F 21/44 701/29.6 |
| 9,063,525 | B2* | 6/2015 | Sanders | G05B 11/01 |
| 9,094,205 | B2* | 7/2015 | Hartley | H04L 9/0866 |
| 2002/0072822 | A1* | 6/2002 | Raymond | G01R 31/2806 700/108 |
| 2003/0101354 | A1* | 5/2003 | Okabe | G06F 9/24 726/34 |
| 2003/0204743 | A1* | 10/2003 | Devadas | G06F 21/31 726/9 |
| 2004/0054894 | A1* | 3/2004 | Lambert | G06F 21/10 713/165 |
| 2005/0210349 | A1* | 9/2005 | Lambert | G01R 31/318563 714/726 |
| 2006/0149966 | A1* | 7/2006 | Buskey | H04L 9/3271 713/168 |
| 2006/0210082 | A1* | 9/2006 | Devadas | G06F 21/31 380/277 |
| 2006/0226864 | A1* | 10/2006 | Kramer | G01R 31/2822 324/750.15 |
| 2007/0123304 | A1* | 5/2007 | Pattenden | G06F 1/26 455/557 |
| 2007/0123316 | A1* | 5/2007 | Little | G06F 21/31 455/573 |
| 2007/0143623 | A1* | 6/2007 | Walmsley | H04L 9/3271 713/176 |
| 2007/0168669 | A1 | 7/2007 | Jonas | |
| 2007/0174700 | A1 | 7/2007 | Dalzell et al. | |
| 2008/0163349 | A1* | 7/2008 | Okimura | B41J 29/393 726/9 |
| 2009/0245518 | A1* | 10/2009 | Bae | H04L 9/0891 380/273 |
| 2010/0056228 | A1* | 3/2010 | Brown | G06F 21/81 455/572 |
| 2011/0062240 | A1* | 3/2011 | Anderson | G06F 21/73 235/492 |
| 2011/0145586 | A1* | 6/2011 | Meyn | G06F 21/72 713/176 |
| 2011/0154043 | A1* | 6/2011 | Lim | G06F 21/73 713/172 |
| 2011/0297932 | A1* | 12/2011 | Shimada | G11C 16/20 257/48 |
| 2012/0025391 | A1* | 2/2012 | Imai | G11C 8/12 257/773 |
| 2012/0079332 | A1* | 3/2012 | Doumenjou | G01R 31/31719 714/726 |
| 2012/0159652 | A1* | 6/2012 | Gurumoorthy | G06F 21/575 726/34 |
| 2012/0242459 | A1* | 9/2012 | Lambert | H04W 12/06 340/10.3 |
| 2012/0303527 | A1* | 11/2012 | Karlisch | G06Q 20/425 705/44 |
| 2013/0132722 | A1* | 5/2013 | Bennett | H04L 9/0816 713/171 |
| 2013/0157618 | A1* | 6/2013 | Billau | H04W 40/02 455/411 |
| 2013/0158936 | A1* | 6/2013 | Rich | G01K 13/00 702/130 |
| 2013/0191643 | A1* | 7/2013 | Song | H04L 9/3247 713/176 |
| 2013/0263290 | A1* | 10/2013 | Xu | G07C 9/00571 726/34 |
| 2013/0269043 | A1* | 10/2013 | Limaye | G06F 21/10 726/34 |
| 2014/0164779 | A1* | 6/2014 | Hartley | H04L 9/3247 713/176 |
| 2014/0181894 | A1* | 6/2014 | Von Bokern | H04L 63/061 726/1 |
| 2015/0186449 | A1* | 7/2015 | Raghavan | G06F 9/44552 707/690 |
| 2015/0242620 | A1* | 8/2015 | Newell | G06F 21/44 726/30 |
| 2015/0349967 | A1* | 12/2015 | Chen | H04L 9/3278 713/193 |
| 2016/0170826 | A1* | 6/2016 | Oechsle | G06F 11/0721 714/24 |
| 2016/0171223 | A1* | 6/2016 | Covey | G06F 9/4401 713/189 |
| 2016/0189802 | A1* | 6/2016 | Kim | G11C 29/82 714/718 |
| 2017/0220784 | A1* | 8/2017 | Chellappa | G06F 21/126 |

OTHER PUBLICATIONS

Kim, "An Efficient and Scalable Re-authentication Protocol over Wireless Sensor Network", IEEE Transactions on Consumer Electronics, vol. 57, No. 2, May 2011, pp. 516-522.*
Buskey, "Protected JTAG", Proceedings of the 2006 International Conference on Parallel Processing Workshops (ICPPW'06), 2006, IEEE, 8 pages.*
Rosenfeld, "Attacks and Defenses for JTAG", IEEE Design & Test of Computers, 2010, pp. 36-47.*
Rosenfeld, "Attacks and Defenses for JTAG", IEEE Design & Test of Computers, 2010, 12 pages. (Year: 2010).*
Verbauwhede, "Design methods for Security and Trust", EDAA, 2007, pp. 672-677. (Year: 2007).*
Banga, "Guided Test Generation for Isolation and Detection of Embedded Trojans in ICs", GLSVLSI'08, May 4-6, 2008, Orlando, Florida, USA, pp. 363-366. (Year: 2008).*
Intellitech, "JTAG Security," 2009, retrieved from http://www.intellitech.com/pdf/anti-tamper-basics.pdf, on Feb. 23, 2015, 17 pages.
Freescale Semiconductor, "i.MX53 Applications Processors for Industrial Products, Silicon Version 2.1," Data Sheet: Technical Data, Document No. IMX53IEC, Rev. 6, Mar. 2013, 173 pages.
Rosenfeld, et al., "Attacks and Defenses for JTAG," Verifying Physical Trustworthiness of ICs and Systems, IEEE Design & Test of Computers, Aug. 2009, 12 pages.

* cited by examiner

DETECTION OF HARDWARE TAMPERING

TECHNICAL FIELD

The present disclosure relates to tamper detection in electronic devices.

BACKGROUND

The electronics industry has long been vexed by the problem of unauthorized modification of electronic products or devices. Unscrupulous parties often take legitimate electronic products and replace components to illegally upgrade or otherwise modify those products.

Currently there is no good way to assure a customer that the components in an electronic product are those that were shipped with the product, and that the components in the device have not been swapped out with components that contain compromised logic.

DESCRIPTION OF EXAMPLE EMBODIMENTS

Overview

In an embodiment, a trusted guard module stores one or more identifiers, each identifier each uniquely identify a respective electronic component of one or more electronic components in a circuit, wherein each electronic component is previously programmed with its respective identifier. The one or more electronic components are in communication with the trusted guard module via a test data channel. A query is sent from the trusted guard module to a first electronic component of the one or more electronic components one of the electronic components, the query requesting that the first electronic component provide its respective identifier to the trusted guard module. The guard module then receives a response from the first electronic component. The trusted guard module compares the response to a stored identifier for the first electronic component. If the response fails to correspond to the stored identifier for the first electronic component, the trusted guard module asserts an alarm condition. In one embodiment, the logic of the trusted guard module may be trusted. Generally, the trust in the guard module logic may be derived through a process internal to the logic, such as a signature process or other internal integrity check. Alternatively or in addition, implementation of the trusted guard module may include hardware measures and other physical precautions to protect the integrity of the trusted guard module and its logic.

Example Embodiments

The apparatus and methods discussed herein detect unauthorized replacement of an electronic component in a circuit. Detection of unauthorized replacement of a component is performed by using a test data channel in the circuit. The test data channel electrically connects some or all of the components in a circuit board for example. This connection of the components is sometimes called a boundary scan chain. An example of a test data channel is that described in the IEEE 1149.1 Standard Test Access Port and Boundary-Scan Architecture that originated in 1990 with the work of the Joint Test Action Group (JTAG). This architecture is sometimes known as the JTAG architecture, named after the working group. A JTAG interface is a standards-based hardware interface that normally supports the use of the test data channel for legitimate development and manufacturing activities. A JTAG interface allows low level test port access to various components on circuit boards. The JTAG interfaces are widely used to support low level debugging, firmware programming, boundary scans, etc. As a result of this wide use, there is an entire ecosystem that exists to create software and hardware interfaces to the JTAG interfaces.

On many circuit boards today, there can be multiple components that have JTAG interfaces (e.g., FPGAs and a CPU on the same board). These interfaces are chained together from a wiring perspective and presented on the board through a single header for connectivity to a tooling ecosystem, for example. The boundary scan chain provides low-level access to components. Once attached to this header, a user is able to perform a wide range of actions, even while the system is running. Specifically, the user can read memory out of a running circuit board (regardless of software or CPU-based access controls) for purposes of debugging, for example, or can reprogram flash (even if the software on the circuit board has access controls that prevent others from doing so), for example. It is also possible to test for certain faults. Such faults may include shorts, opens, and logic errors for example. This testing may be performed after manufacturing, or, in some cases, while the board is in operation.

In an embodiment, a guard module is incorporated on the circuit board and connected to the test data channel. Using the guard module's access to the test data channel, the guard module can interact with components in the chain. This interaction will involve fingerprinting a target component by looking at identifying information in the component. One example of such information is the Electronic Chip Identifier (ECID). The ECID is described in IEEE 1149.1-2013 and represents component (i.e., chip) identification. The ECID is programmed into the component by the chip manufacturer. This, in conjunction with supplemental identification information such as an IDCODE (i.e., ID code and revision information for the chip itself), results in an aggregate identifier comparable to a vehicle identification number (VIN) of an automobile. Such an identifier maps uniquely to each component connected to the test data channel. Optionally, another area of the target component or chip may also store provisioned unique identifiers, apart from the ECID and/or IDCODE.

The identifiers can be accessed by the guard module during the manufacturing process, in an embodiment. The identifiers can then be stored in protected storage in the guard module. These values may be signed by a key to assure that the values themselves have not been subjected to tampering.

Upon product boot in a customer's environment, the guard module will query the components and compare received values with the previously stored values. Success or failure of the comparison may result in assertion of an alarm condition. This may result in alerts sent to the user or administrator, or the guard module changing the behavior of the circuit (e.g., not allowing it to boot, or powering down the circuit). In an embodiment, the values received as a result of the query may be made available outside of the device for analysis.

Given the role of the guard module, the logic executed in the guard module may need to be certified as to its integrity in order to be trusted. To do this, a trust anchor may be relied upon to provided trust in the functionality of the guard module. As will be described below, the trust anchor may be a common source of trust with other components and processes, such as a secure boot of a central processing unit (CPU) on the circuit board. Trust in the guard module may then be derived from this secure boot process.

Figure 1:
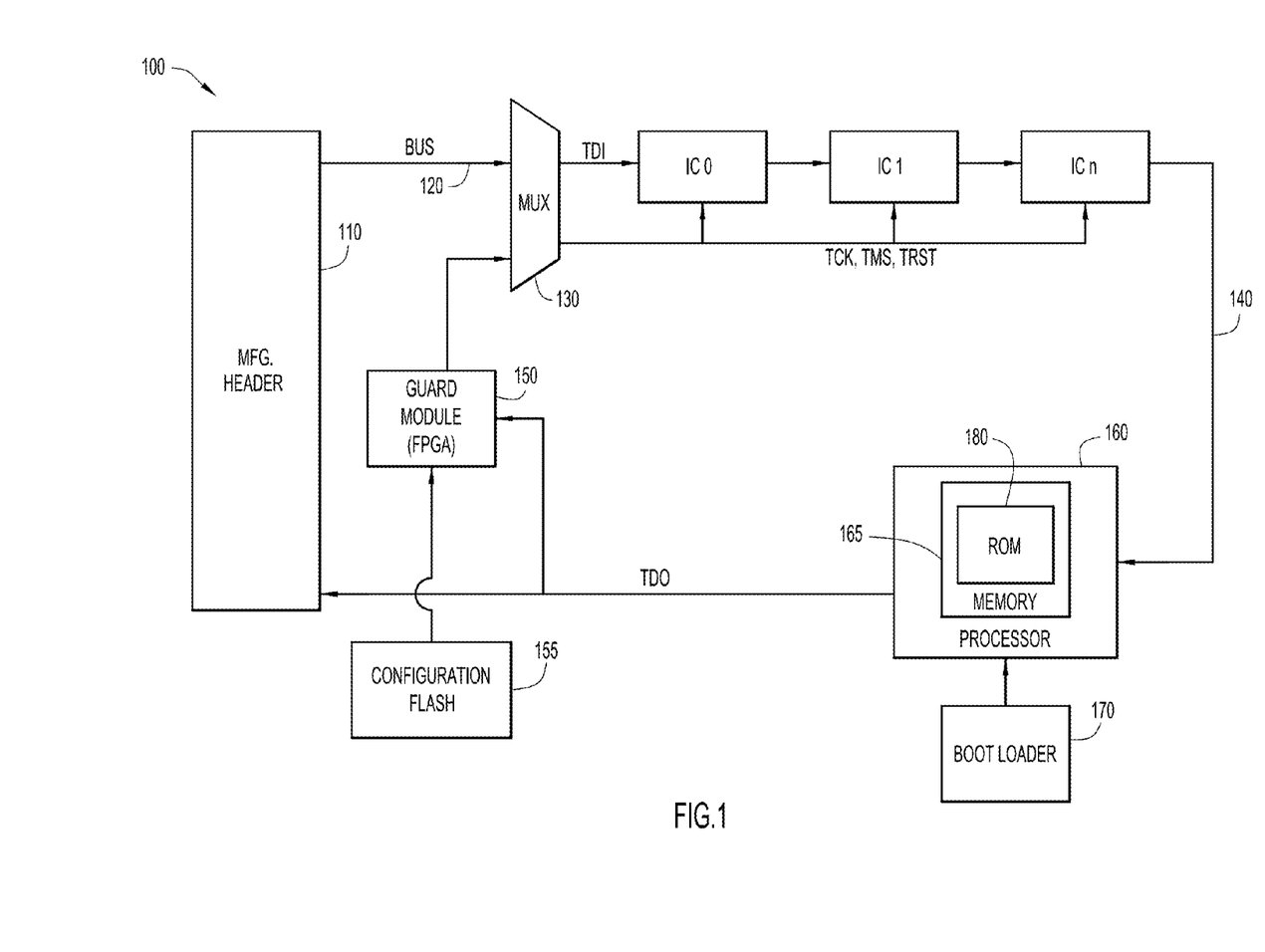
FIG. 1 is a block diagram of a circuit that incorporates the functionality described herein, according to an example embodiment.

FIG. 1 illustrates a circuit board in which unauthorized replacement of components can be detected, according to an embodiment. A circuit board 100 may have a number of components mounted thereon. These components may include integrated circuits (ICs), shown here as IC 0, . . . IC n. The ICs on the circuit board 100 are connected (i.e., electrically chained) together. A physical manufacturing header 110 is also connected to the chain. The header 110 is an interface that allows programming and/or testing of the components on the circuit board 100 and of the board as a whole, during and/or after manufacture. Using the header 110, test equipment (not shown) may be connected to the circuit board 100 via a bus 120. The electrical path 140 that connects the ICs and the header 110 represents the test data channel. In the illustrated embodiment, the header 110 is connected to the ICs through a bus 120 and a multiplexer 130. The signals provided to the ICs during testing may include a test_data_in (TDI) signal. An output signal is shown as test_data_out (TDO). Other signals provided to the ICs may include test_clock (TCK), test_mode_select (TMS) and test_reset (TRST).

A guard module 150 is also shown connected to the test data channel 140. In the illustrated embodiment, the guard module 150 is implemented as a field programmable gate array (FPGA). The logic programmed into the guard module 150 may be trusted, with its trust derived from a trust anchor. In an embodiment, the guard module 150 may be programmed using a configuration flash device 155. In an alternative embodiment (not shown), the guard module 150 may be implemented as a programmable processor or controller that executes software to perform the processing described herein. In such an embodiment, the code executed by the guard module 150 may be trusted. The operation of the guard module 150 and the granting of its trusted status will be discussed below.

Figure 2:
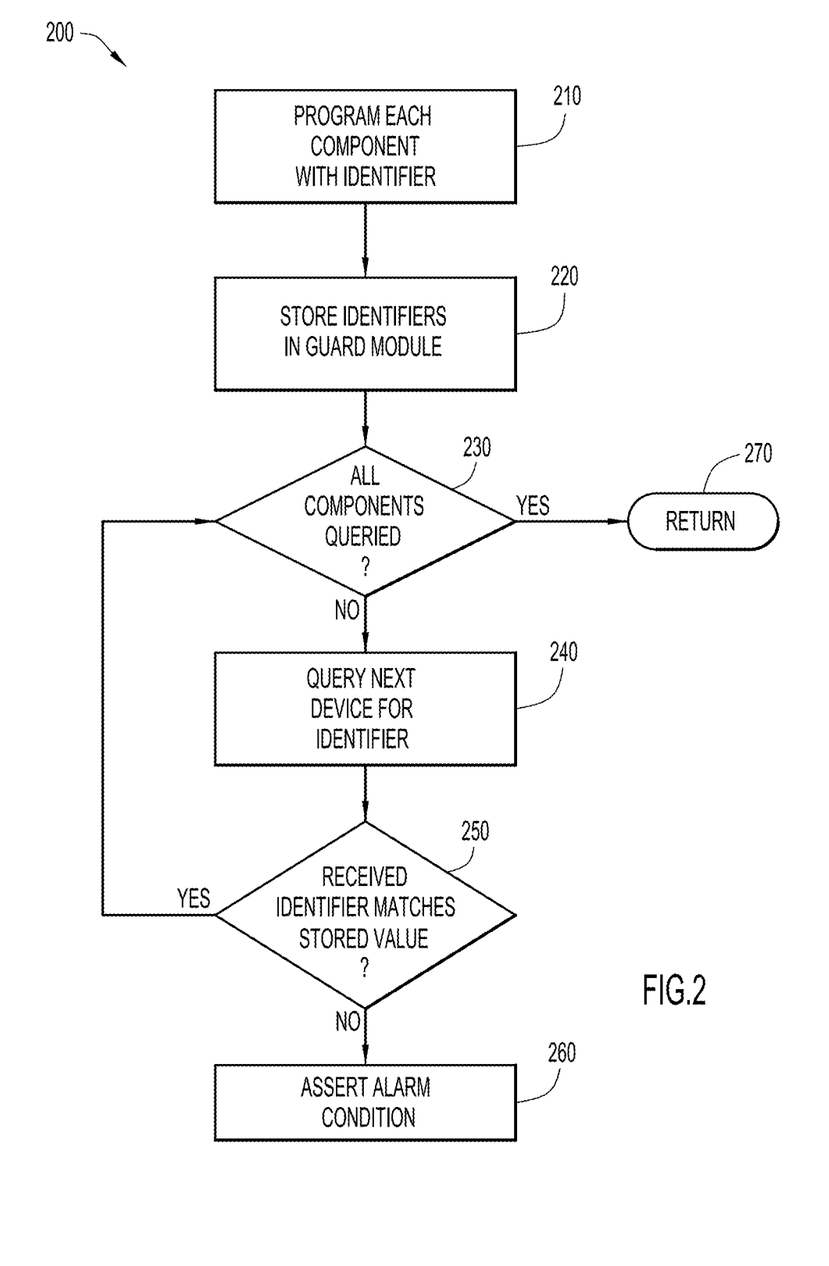
FIG. 2 is a flow chart illustrating the processing of the system described herein, according to an example embodiment.

FIG. 2 illustrates processing related to the guard module 150, according to an embodiment. At 210, each component to be mounted in a circuit (e.g., on a circuit board) is programmed with a unique identifier. As discussed above, each identifier may include an ECID, other ID code, and/or revision information. In an embodiment the programming of an identifier into a component is done during the manufacturing process for the component. At 220, the identifiers for components in the circuit are stored in the guard module. In an embodiment, this may be performed during manufacturing of the circuit. The identifiers may be stored in a secure storage location in the guard module, and may be signed to assure their integrity.

At 230, a determination is made as to whether all the components have been queried. If not, then at 240, a first electronic component is queried by the guard module. Here, the guard module asks the first electronic component to provide its identifier. When the identifier is received, it is compared to the corresponding value stored in the guard module and a determination is made at 250 as to whether there is a match. If not, the first electronic component may be a replacement component, and an alarm condition is asserted at 260. The alarm condition may include, but is not limited to including, halting operation of the circuit, outputting a warning to a user or operator, and/or raising an exception. As will be described below, the alarm condition may also result in reporting information regarding the alarm to a centralized location in a network with which the circuit is in communication. Otherwise, the process continues at 230. If all the components have been queried (as determined at 230), the process may end at 270. If there are one or more electronic components that still need to be queried, then the next component is queried at 240.

In an embodiment, operations 230-270 may take place during a start up process for the circuit. These operations may be repeated periodically or aperiodically during operation of the circuit in other embodiments.

Figure 3:
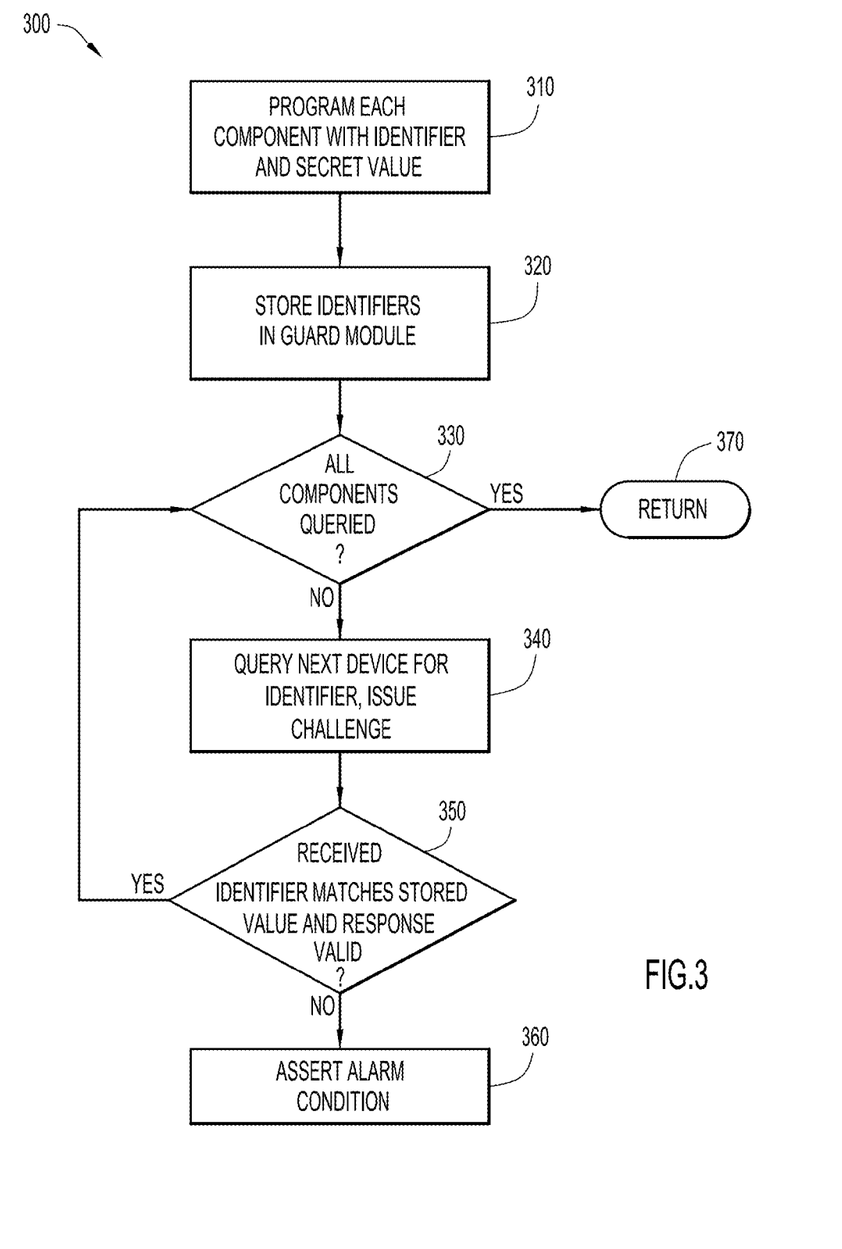
FIG. 3 is a flow chart illustrating the processing of the system described herein, according to an example embodiment.

FIG. 3 illustrates processing according to an alternative embodiment. Here, the interaction between the guard module 150 and each electronic component includes a query for an identifier, and also includes a challenge and response. At 310, each electronic component to be mounted in a circuit is programmed with a unique identifier and a secret value. In an embodiment, the secret value may be unique per component and may be randomly generated. As discussed above, each identifier may include an ECID, other ID code, and/or revision information. In an embodiment, the programming of an identifier and secret value into an electronic component is done during the manufacturing process for the component. At 320, the identifiers and secret values for components in the circuit are stored in the guard module. In an embodiment, this may be performed during manufacturing of the circuit. The identifiers and secret values may be stored in a secure storage location in the guard module, and may be signed to assure their integrity.

At 330, a determination is made as to whether all the electronic components have been queried. If not, then at 340, a first electronic component is queried by the guard module. Here, the guard module asks the component to provide its identifier. In addition, a challenge is issued by the guard module to the first electronic component. When the identifier is received, it is compared to the corresponding value stored in the guard module. A response to the challenge is also received at the guard module and compared to the secret value corresponding to the first electronic component. A determination is made at 350 as to whether there is a match for the stored identifier and whether the received secret value is valid. If either fails, the first electronic component may be a replacement component, and an alarm condition is asserted at 360. The alarm condition may include halting operation of the circuit, outputting a warning to a user or operator, and/or raising an exception. As will be described below, the alarm condition may also result in reporting information regarding the alarm to a centralized location in a network to which the circuit is in communication. Otherwise, the process continues at 330. If all the electronic components have been queried, the process may end at 370. If there are electronic components that still need to be queried, then the next electronic component is queried and challenged at 340.

In an embodiment, the secret value may change over time, in order to make it difficult for an unauthorized party to spoof. In such an embodiment, the process by which this value changes will be the same at both the component and at the guard module. This process may be deterministic and pseudorandom, and may be cryptographically based.

In an embodiment, operations 330-370 may take place during a start up process for the circuit. These operations may be repeated periodically or aperiodically during operation of the circuit in other embodiments.

Figure 4:
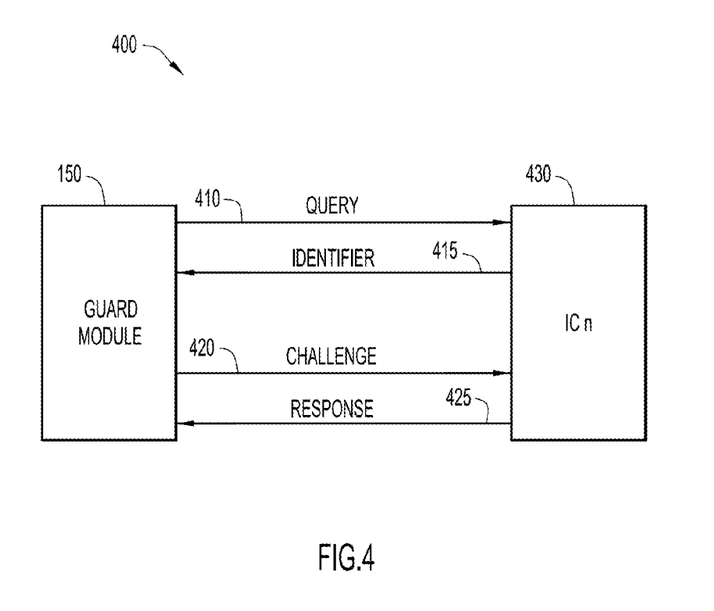
FIG. 4 is a block diagram illustrating a challenge and response protocol, according to an example embodiment.

FIG. 4 illustrates the interaction between a guard module 150 and a component shown as IC n (reference 430). A query 410 is issued by the guard module 150 to the IC 430, after which the IC 430 provides an identifier 415 to the guard module 150. A challenge 420 is also sent to the IC 430; a response to challenge 420 is then sent by the IC 430 to the guard module 150. If either the identifier 415 or the response 425 fail to match the expected respective values at guard module 150, or if either the identifier 415 or the response 425 is not received, then an alarm condition is asserted by guard module 150.

Figure 5:
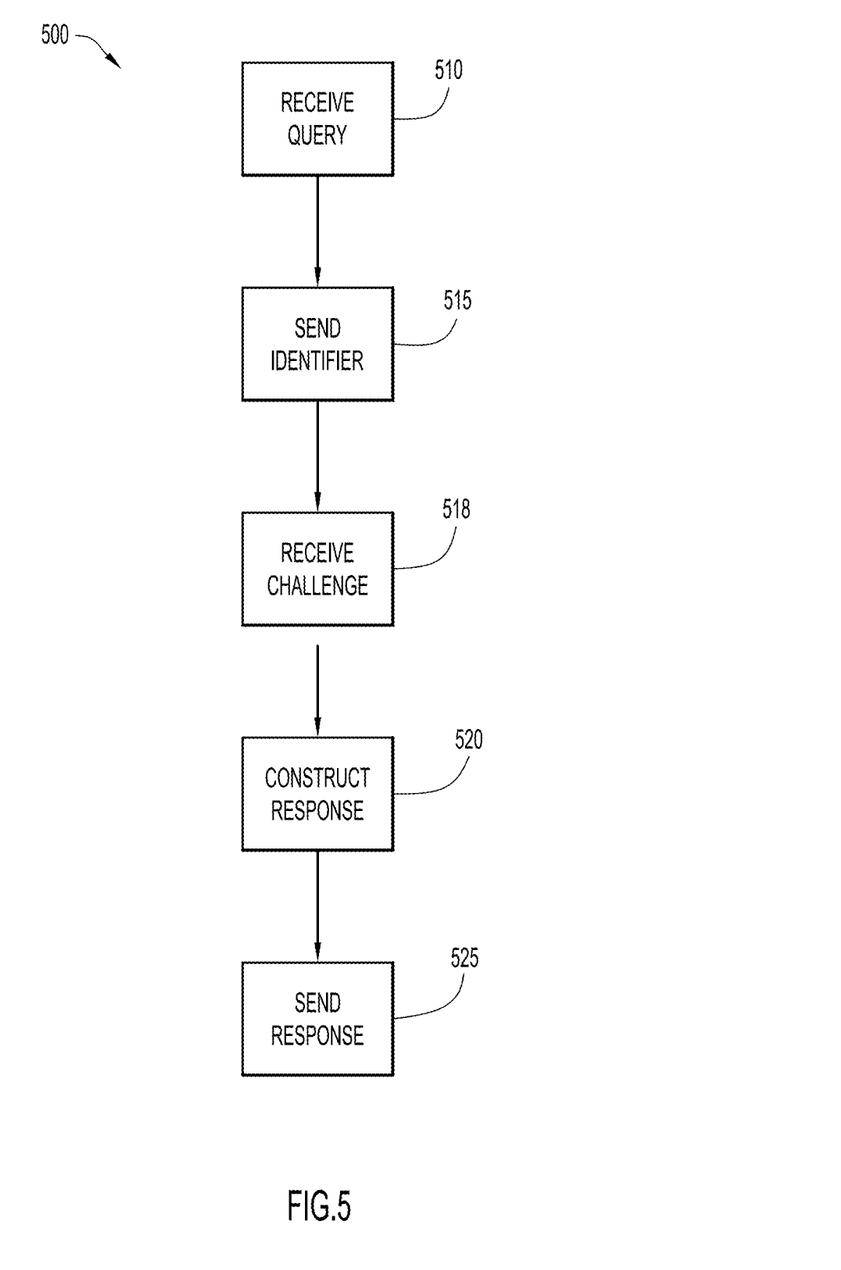
FIG. 5 is a flow chart illustrating the processing at a queried module, according to an example embodiment.

Processing at a component of a circuit is illustrated in FIG. 5. At 510, the component receives a query from the guard module. At 515, the component sends its identifier to the guard module. At 515, the component receives a challenge from the guard module. At 520, the component constructs a response. As discussed above, the response may not be a static value; in this situation, the component may have to execute a process at 520 in order to construct the appropriate response. At 525, the response is sent to the guard module.

In another embodiment, the guard module 150 counts the clock cycles needed for the different devices on the test data channel to respond to its query. An adversary could, for example, build and insert a chip, module, or other circuitry in an attempt to spoof the guard module 150. Such inserted circuitry would be configured to answer the guard module 150 with the expected response(s). In this embodiment, however, such circuitry would not only have to emulate the component responses, but would then also have to match the timing of the emulated components. Failure to provide a response in the expected number of clock cycles would suggest tampering, and would trigger an alarm condition at the guard module.

In some cases, global visibility to large numbers of products can yield a unique perspective on adversarial activity. There can be benefit to externalizing the results of guard modules (i.e., alarm conditions) as they perform the above processing in multiple respective installations. Such results can be sent to a cloud based service. This data would then have statistical algorithms applied, which would help identify additional issues not seen with localized visibility. For instance, reconciliation between the configuration of a device as it left manufacturing and what the product is reporting from a deployment, could yield a confirmation of integrity, or reveal a need for further investigation. When multiple deployed devices are considered, statistical data can be collected on a larger scale, revealing anomalous situations and patterns. Such analysis would be enabled by a broad (or even global) correlation capability.

In an embodiment consistent with these goals, assertion of an alarm condition may include reporting of the alarm to a central location. Such reporting may include the identifier of the component in question and the identity of the circuit (e.g., circuit board) on which the component in question is located, or should have been located. The identity of the circuit may include a model or series number for example, or more specific information that identifies the particular circuit. The reported information can then be analyzed, along with any other reports from other circuits. This data in aggregate, along with other supporting data, may reveal trends. Such trends may include, for example, a specific model or type of circuit that is being targeted more than others, a specific component that is being targeted, or a specific operational location, distribution channel, or manufacturing facility where circuits tend to be targeted, etc. The determination of such trends and correlations would allow the development of focused countermeasures to the suspected tampering.

Figure 6:
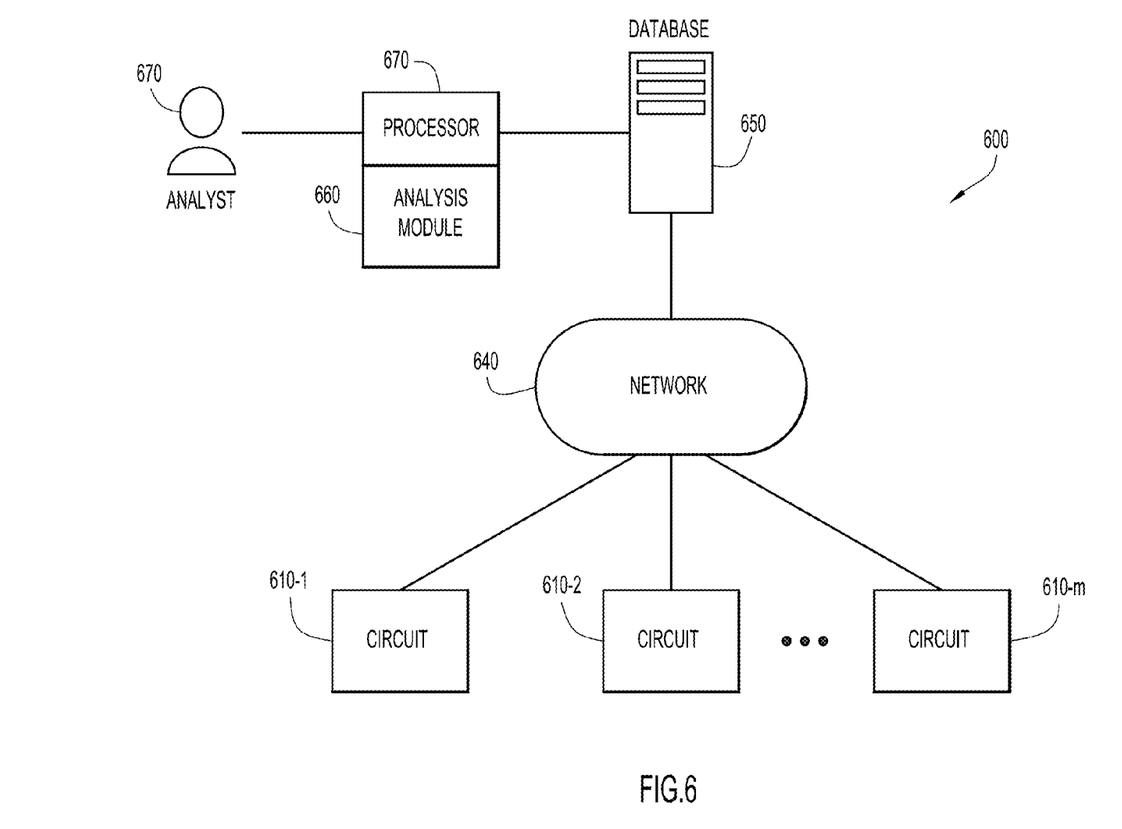
FIG. 6 is a block diagram illustrating the reporting of comparison results to an analysis module, according to an example embodiment.

A system for such reporting and analysis is illustrated in FIG. 6, according to an embodiment. A number of circuits are shown, 610-1, 610-2, . . . 610-$m$. Each may generally be configured in the manner shown in FIG. 1, each having a respective guard module in communication with components in the circuit via test data channel. These circuits may or may not be of the same model or functionality. If an alarm condition is generated in any of the circuits 610-1, 610-2, . . . 610-$m$ (in the manner illustrated in FIG. 2 or 3, for example), the alarm condition is reported to a central location, such as a database 650. In the illustrated embodiment, the database 650 is located remotely from the circuits 610-1, 610-2, . . . 610-$m$ and receives the report via a network 640. In this sense, the report is sent to a location (i.e., database 650) "in the cloud."

The database 650 may already store data related to circuits 610-1, 610-2, . . . 610-$m$ and/or to other circuits. This previously stored data may include information that allows and supports the analysis of the reported information. Such data may include the manufacturing locations of various types and lots of circuits, configuration control information for circuits, supply chains through which the circuits may have passed, and the facilities in which the circuits are deployed, for example. This data, along with the reported information, can be used to identify trends and correlations in suspected tampering activity. Tampering may be targeted at specific types or models of circuits, for example, or at specific types of components. Tampering may be targeted at circuits that have been manufactured at a particular facility, or that passed through a particular warehouse, for example.

Such patterns may be revealed through the analysis of the reported information resulting from the alarm conditions in the circuits, where the analysis is supported by the data already stored in database 650. Such trends may be identified in an automated manner, using an analysis module 660. In an embodiment, such analysis may be performed by a suitably programmed processor 670, wherein analysis module 660 represents the analytic software executed by processor 670. In the illustrated embodiment, an analyst 670 interfaces with the analysis module 660 to direct the operation of module 660. In an alternative embodiment, the analysis may be strictly a human process. In this case, the analysis may be performed by analyst 670 using the data in database 650, without using any analytic tools.

Referring again to FIG. 1, the processing performed by the guard module 150 can be a trusted operation. If the processing of this module were subverted, then its ability to detect tampering could be compromised. Therefore, in settings where subversion of this module (or the logic therein) is considered a possibility, measures may be taken to assure the trustworthiness of guard module 150.

If guard module 150 is implemented as an FPGA, trust in the logic as programmed into the FPGA may be ensured through a secure signature process. A key may be used to sign the logic, so that at start-up the logic may be trusted. In an embodiment, the logic in the monitoring module may derive its trust from a trust anchor. This trust anchor may also represent a source of trust from which other logic in the circuit board derives trust. For example, in an embodiment the key may be the same as that used in a secure boot process for central processor 160 on the circuit board, or may have its trust derived from the same digital certificate used to establish trust in the boot process of the processor 160. Generally, the trust in the guard module's logic may be derived through a process internal to the logic, such as a signature process or other internal integrity check. Alternatively or in addition, implementation of the guard module 150 may include hardware measures and other physical precautions to protect the integrity of the module and its logic.

Figure 7:
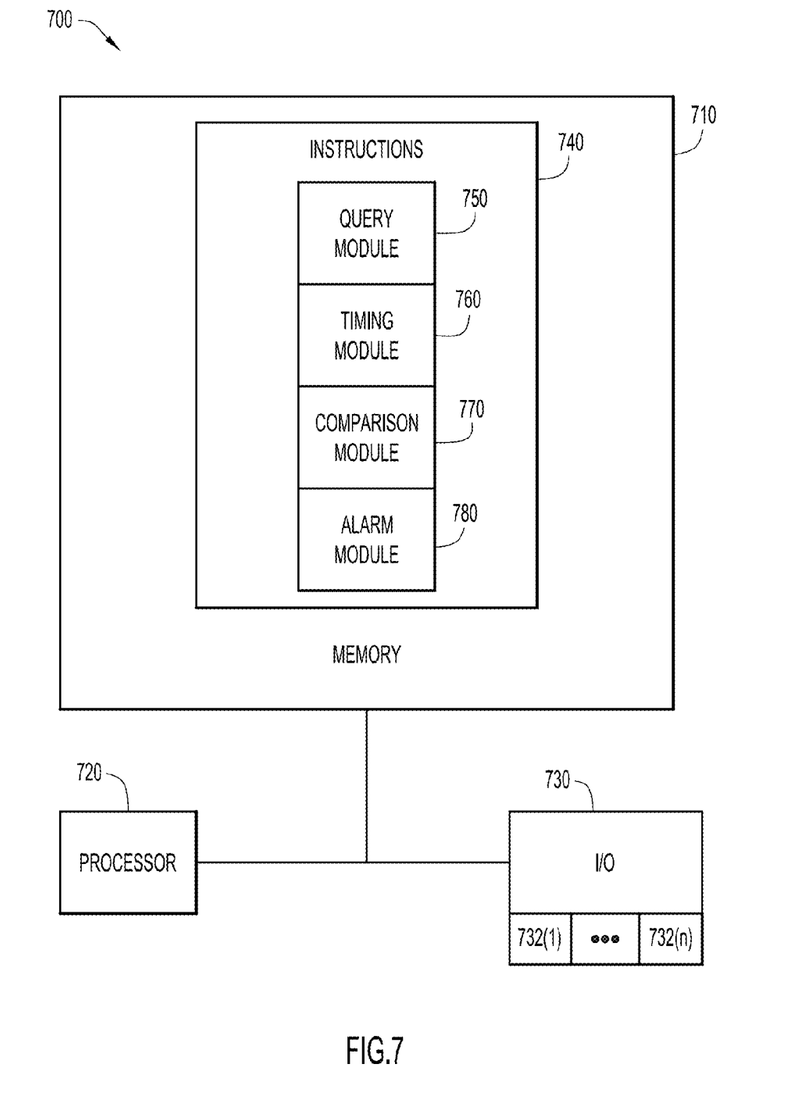
FIG. 7 is a block diagram illustrating a software or firmware embodiment of a guard module, according to an example embodiment.

In an embodiment, the functions of the guard module 150 may be implemented as a programmable processor executing software or firmware (or a combination thereof). A software or firmware embodiment of these operations is illustrated in FIG. 7. Computing system 700 includes one or more memory devices, shown collectively as memory 710. Memory 710 is in communication with one or more processors 720 and with one or more input/output units 730. An example of an I/O unit is a network processor unit that may have associated network ports or other ports 732(1)-732(K). In an embodiment, queries may be sent via I/O 730 to components on the circuit board; a response to the query may also be received via I/O 730. The I/O 730 may include one or more Application Specific Integrated Circuits (ASICs) that are configured with digital logic gates to perform various networking and security functions (routing, forwarding, deep packet inspection, etc.).

Memory 710 may comprise, but is not limited to comprising, read only memory (ROM), random access memory (RAM), magnetic disk storage media devices, optical storage media devices, flash memory devices, electrical, optical, or other physically tangible (i.e., non-transitory) memory storage devices. Memory 710 stores data as well as executable instructions 740. Instructions 740 are executable on processor(s) 720. The processor(s) 720 comprise, for example, a microprocessor or microcontroller that executes instructions 740. Thus, in general, the memory 710 may comprise one or more tangible (non-transitory) computer readable storage media (e.g., memory device(s)) encoded with software or firmware that comprises computer executable instructions. When the instructions are executed (by the processor(s) 720) the software or firmware is operable to perform the operations of the guard module described herein.

In the illustrated embodiment, the executable instructions 740 may include several logic modules. These include a query module 750 responsible for formulating and sending queries and/or challenges to components on the circuit board. A timing module 760 may be responsible for determining the time (measured in clock cycles, for example) that it takes for a component to respond to a query or challenge. Instructions 740 may also include a comparison module 770 for comparing a response to an expected value. This module may also compare the time taken by a component to respond, to an expected time value. An alarm module 780 may be responsible for asserting an alarm condition if any of the comparisons fail.

A trusted guard module therefore stores one or more identifiers, each identifier uniquely identifying a respective electronic component of one or more electronic components in a circuit, wherein each electronic component is previously programmed with its respective identifier. The one or more electronic components are in communication with the guard module via a test data channel. A query is sent from the guard module to a first electronic component of the one or more electronic components, the query requesting that the first electronic component provide its respective identifier to the guard module. The guard module then receives a response from the first electronic component. The guard module compares the response to the stored identifier for the first electronic component. If the response fails to correspond to the stored identifier for the first electronic component, the guard module asserts an alarm condition.

In one form, the above processing includes storing one or more identifiers in a trusted guard module, where each identifier uniquely identifying a respective electronic component of one or more electronic components in a circuit, wherein each electronic component is previously programmed with its respective identifier. The processing also includes sending a query from the trusted guard module to a first electronic component of the one or more electronic components via a test data channel, the query requesting that the first electronic component provide its respective identifier to the trusted guard module, and receiving a response from the first electronic component via the test data channel. The process also includes comparing the response to the stored identifier for the first electronic component and, when the response fails to correspond to the stored identifier for the first electronic component, asserting an alarm condition. The one or more electronic components are in communication with the trusted guard module via a test data channel.

In another form, an apparatus comprises one or more electronic components; a trusted guard module; and a test data channel connecting the one or more electronic components and the trusted guard module in a boundary scan system. The trusted guard module includes trusted logic configured to store one or more identifiers, each identifier uniquely identifying a respective one of the one or more electronic components, wherein each electronic component is previously programmed with its respective identifier. The trusted guard module is further configured to send a query from the trusted guard module to a first electronic component of the one or more electronic components via the test data channel, the query requesting that the first electronic component provide its respective identifier to the trusted guard module, and to receive a response from the first electronic component via the test data channel. The trusted guard module is further configured to compare the response to a stored identifier for the first electronic component. When the response fails to correspond to the stored identifier for the first electronic component, an alarm condition is asserted.

In another form, one or more non-transitory computer readable storage media are encoded with software comprising computer executable instructions that, when executed on a programmable processor, are operable to store one or more identifiers, each identifiers uniquely identifying a respective one of one or more electronic components, wherein each electronic component is previously programmed with its respective identifier; send a query to a first electronic component of the one or more electronic components via test data channel, the query requesting that a first electronic component provide its respective identifier to a processor; receive a response from the first electronic component via the test data channel; compare the response to a stored identifier for the first electronic component; and when the response fails to correspond to the stored identifier for the first electronic component, assert an alarm condition.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method comprising:
   storing one or more identifiers in a trusted guard module, each identifier uniquely identifying a respective electronic component of one or more electronic components in a circuit, wherein each electronic component of the one or more electronic components is previously programmed with its respective identifier;
   sending a query from the trusted guard module to a first electronic component of the one or more electronic components via a test data channel, the query requesting that the first electronic component provide its respective identifier to the guard module;
   receiving a response from the first electronic component via the test data channel;
   comparing the response to a stored identifier for the first electronic component; and
   when the response fails to correspond to the stored identifier for the first electronic component, asserting an alarm condition,
   wherein the one or more identifiers each comprises a unique secret value different from the one or more identifiers, and wherein the unique secret value changes over time,
   wherein a same process by which the secret value changes is a pseudorandom process that is performed in both the first electronic component and the trusted guard module,
   wherein the one or more identifiers each comprises an electronic chip identifier (ECID), and
   wherein the trusted guard module derives its trust from a secure trust anchor.

2. The method of claim 1, wherein the test data channel operates in a manner consistent with IEEE Standard 1149.1.

3. The method of claim 1, further comprising:
   counting a number of clock cycles between the sending of the query and the receipt of the response;
   determining when the number of clock cycles is equal to an expected number of clock cycles for the first electronic component; and
   when the number of clock cycles is not equal to the expected number of clock cycles for the first electronic component, asserting the alarm condition.

4. The method of claim 1, further comprising:
   sending information regarding the alarm condition to an analysis module that is remote from the circuit; and
   sending information identifying the first electronic component to the analysis module.

5. An apparatus, comprising:
   one or more electronic components;
   a guard module; and
   a test data channel connecting the one or more electronic components and the guard module in a boundary scan system,
   wherein the guard module comprises trusted logic that is configured to:
   store one or more identifiers in the guard module, each identifier uniquely identifying a respective one of the one or more electronic components, wherein each electronic component of the one or more electronic components is previously programmed with its respective identifier;
   send a query from the trusted guard module to a first electronic component of the one or more electronic components via the test data channel, the query requesting that the first electronic component provide its respective identifier to the guard module;
   receive a response from the first electronic component via the test data channel;
   compare the response to a stored identifier for the first electronic component; and
   when the response fails to correspond to the stored identifier for the first electronic component, assert an alarm condition,
   wherein the one or more identifiers each comprises a unique secret value different from the one or more identifiers, and wherein the unique secret value changes over time,
   wherein a same process by which the secret value changes is a pseudorandom process that is performed in both the first electronic component and the trusted guard module,
   wherein the one or more identifiers each comprises an electronic chip identifier (ECID), and
   wherein the guard module derives its trust from a secure trust anchor.

6. The apparatus of claim 5, wherein the test data channel is configured to operate in a manner consistent with IEEE Standard 1149.1.

7. The apparatus of claim 5, wherein the guard module is further configured to:
   count a number of clock cycles between sending the query and receipt of the response;
   determine when the number of clock cycles is equal to an expected number of clock cycles for the first electronic component; and
   when the number of clock cycles is not equal to an expected number of clock cycles for the first electronic component, assert the alarm condition.

8. The apparatus of claim 5, wherein the guard module is further configured to:
   send information regarding the alarm condition to an analysis module that is remote from the apparatus; and
   send information identifying the first electronic component to the analysis module.

9. One or more non-transitory computer readable storage media encoded with software comprising computer executable instructions that, when executed on a programmable processor, are operable to in a guard module:
   store one or more identifiers, each identifier uniquely identifying a respective one of one or more electronic components, wherein each electronic component of the one or more electronic components is previously programmed with its respective identifier;

send a query to a first electronic component of the one or more electronic components via a test data channel, the query requesting that the first electronic component provide its respective identifier to a processor;

receive a response from the first electronic component via the test data channel;

compare the response to a stored identifier for the first electronic component; and when the response fails to correspond to the stored identifier for the first electronic component, assert an alarm condition, wherein the one or more identifiers each comprises a unique secret value different from the one or more identifiers, and wherein the unique secret value changes over time, and wherein a same process by which the secret value changes is a pseudorandom process that is performed in both the first electronic component and the trusted guard module, wherein the one or more identifiers each comprises an electronic chip identifier (ECID), and wherein the guard module derives its trust from a secure trust anchor.

10. The computer readable storage media of claim 9, wherein further comprising instructions operable to communicate over the test data channel in a manner consistent with IEEE Standard 1149.1.

11. The computer readable storage media of claim 9, further comprising instructions that, when executed, are operable to:

count the number of clock cycles between the sending of the query and the receipt of the response;

determine when the number of clock cycles is equal to an expected number of clock cycles for the first electronic component; and when a number of clock cycles is not equal to an expected number of clock cycles for the first electronic component, assert the alarm condition.

12. The computer readable storage media of claim 9, further comprising instructions that, when executed, are operable to:

send information regarding the alarm condition to an analysis module that is remote from the processor; and send information identifying the first electronic component to the analysis module.

* * * * *